United States Patent
Une et al.

(10) Patent No.: US 11,368,607 B2
(45) Date of Patent: Jun. 21, 2022

(54) INFORMATION PROCESSING APPARATUS AND NON-TRANSITORY COMPUTER READABLE MEDIUM STORING PROGRAM FOR IMAGE COLOR CONVERSION

(71) Applicant: FUJIFILM Business Innovation Corp., Tokyo (JP)

(72) Inventors: Kiyoshi Une, Kanagawa (JP); Seiji Shiraki, Kanagawa (JP); Nagamasa Misu, Kanagawa (JP); Ryosuke Tsuji, Kanagawa (JP); Yushiro Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 317 days.

(21) Appl. No.: 16/352,883

(22) Filed: Mar. 14, 2019

(65) Prior Publication Data

US 2019/0356819 A1  Nov. 21, 2019

(30) Foreign Application Priority Data

May 21, 2018 (JP) .............................. JP2018-096931

(51) Int. Cl.
*H04N 1/60* (2006.01)
*G06V 10/44* (2022.01)
*G06V 10/56* (2022.01)

(52) U.S. Cl.
CPC .......... *H04N 1/6072* (2013.01); *G06V 10/44* (2022.01); *G06V 10/56* (2022.01); *H04N 1/6005* (2013.01)

(58) Field of Classification Search
None
See application file for complete search history.

(56) References Cited

U.S. PATENT DOCUMENTS

| | | | | |
|---|---|---|---|---|
| 7,880,924 B2 * | 2/2011 | Lowman | .................. | H04N 1/00 358/1.9 |
| 9,230,186 B2 * | 1/2016 | Ozawa | .................. | G06K 9/4652 |
| 2003/0130990 A1 * | 7/2003 | Brown | .................. | G06F 40/103 |
| 2003/0197880 A1 * | 10/2003 | Nakao | ................ | H04N 1/40012 358/1.9 |
| 2005/0062987 A1 * | 3/2005 | Hashimoto | .............. | H04N 1/56 358/1.9 |

(Continued)

FOREIGN PATENT DOCUMENTS

JP  4783007  9/2011
JP  2012085105  4/2012

OTHER PUBLICATIONS

Office Action of Japan Counterpart Application, with English translation thereof, dated Dec. 21, 2021, pp. 1-6.

*Primary Examiner* — Dung D Tran
(74) *Attorney, Agent, or Firm* — JCIPRNET

(57) ABSTRACT

An information processing apparatus includes a recognition unit that recognizes an object which is included in an image and is expressed using a single color, and a conversion unit that performs conversion on a pixel, which is included in the image and corresponds to a designated color, into a specific color, and, in a case where a color of an area, which is in contact with an outer edge of the recognized object, is designated and a difference between the color of the recognized object and the specific color is smaller than a first reference, performs conversion on a pixel of the outer edge into a color other than the specific color.

12 Claims, 8 Drawing Sheets

(56) References Cited

U.S. PATENT DOCUMENTS

| | | | |
|---|---|---|---|
| 2013/0058575 A1* | 3/2013 | Koo | G06K 9/4652 |
| | | | 382/176 |
| 2013/0322747 A1* | 12/2013 | Ozawa | H04N 1/58 |
| | | | 382/164 |
| 2015/0288853 A1* | 10/2015 | Yamazaki | H04N 1/04 |
| | | | 358/474 |
| 2018/0109699 A1* | 4/2018 | Mori | H04N 1/6008 |
| 2018/0189589 A1* | 7/2018 | Liu | G06K 9/468 |

* cited by examiner

FIG. 5
| OBJECT ID | PIXEL GROUP | HUE (DEGREE) | LIGHTNESS(%) |
|---|---|---|---|
| OB001 | (x1,y1), (x2,y1), ⋯ | – | 100 |
| OB002 | (x30,y30), (x31,y30), ⋯ | 240 | 50 |
| ⋯ | ⋯ | ⋯ | ⋯ |
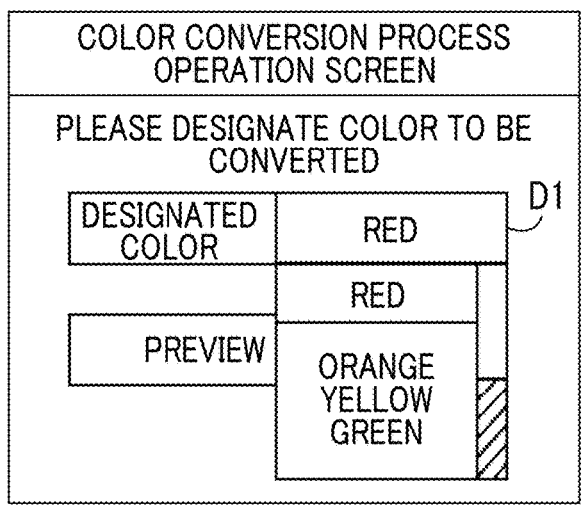
FIG. 6A
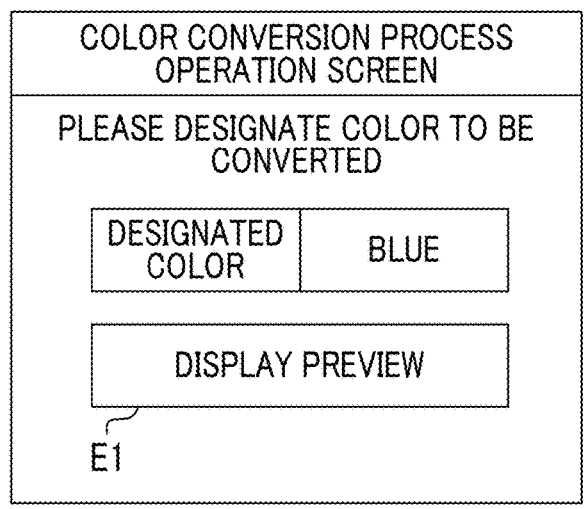
FIG. 6B

INFORMATION PROCESSING APPARATUS AND NON-TRANSITORY COMPUTER READABLE MEDIUM STORING PROGRAM FOR IMAGE COLOR CONVERSION

CROSS-REFERENCE TO RELATED APPLICATIONS

This application is based on and claims priority under 35 USC 119 from Japanese Patent Application No. 2018-096931 filed May 21, 2018.

BACKGROUND

(i) Technical Field

The present invention relates to an information processing apparatus and a non-transitory computer readable medium storing a program.

(ii) Related Art

There exists a technology referred to as a dropout in which an area corresponding to a designated color is removed from an image. JP4783007B discloses the dropout of a color in which a margin is added to a hue.

SUMMARY

In a case where conversion is performed on a pixel corresponding to a designated color into a specific color as in dropout and a text, a drawing pattern, or the like, which is expressed using the specific color inside an area of the color to be converted, exists, information which is expressed by the pixel is lost due to conversion.

Aspects of non-limiting embodiments of the present disclosure relate to an information processing apparatus and a non-transitory computer readable medium storing a program, which prevent the loss of the information in a case where conversion is performed on the pixel corresponding to the designated color into the specific color.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a recognition unit that recognizes an object which is included in an image and is expressed using a single color; and a conversion unit that performs conversion on a pixel, which is included in the image and corresponds to a designated color, into a specific color, and, in a case where a color of an area, which is in contact with an outer edge of the recognized object, is designated and a difference between the color of the object and the specific color is smaller than a first reference, performs conversion on a pixel of the outer edge into a color other than the specific color.

BRIEF DESCRIPTION OF THE DRAWINGS

Exemplary embodiment(s) of the present invention will be described in detail based on the following figures, wherein:

FIG. 5 is a table illustrating an example of object data;

FIGS. 6A and 6B are diagrams illustrating examples of a displayed operation screen;

DETAILED DESCRIPTION

1. EXAMPLE

Figure 1:
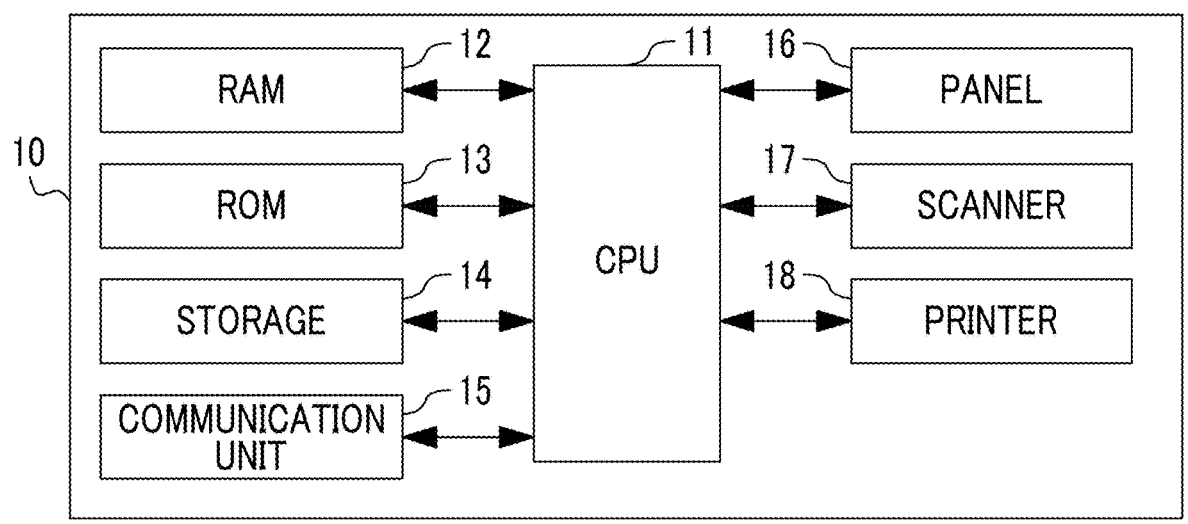
FIG. 1 is a diagram illustrating a hardware configuration of an image processing device according to an Example.

FIG. 1 illustrates a hardware configuration of an image processing device 10 according to an Example. The image processing device 10 is a device which performs image processing on an image read from a document and an image to be printed on paper. In particular, the image processing device 10 performs the image processing (color conversion process) of performing conversion on a designated color area of an image, which is a target of the image processing, with a specific color.

The color conversion process is referred to as a dropout because the color conversion process is frequently used to cause an area having a designated color to be not viewed by converting the designated color into a color of white that is used as a background of an image (it is apparent that the color conversion process is used for another object). The image processing device 10 is a computer which includes a CPU 11, a Random Access Memory (RAM) 12, a Read Only Memory (ROM) 13, a storage 14, a communication unit 15, a panel 16, a scanner 17, and a printer 18.

The CPU 11 controls respective units by executing a program which is stored in the ROM 13 or the storage 14 while using the RAM 12, which is a memory, as a work area. The storage 14 is storage means, such as a Hard Disk Drive (HDD), a Solid State Drive (SSD), or a flash memory, and stores data or a program which is used for control by the CPU 11. The communication unit 15 includes a communication circuit or the like, and performs communication (at least one of wireless communication or wired communication) with an external device through a communication line.

The panel 16 is a touch screen in which a touch panel is combined with a screen. The panel 16 receives an operation of a user, and displays an image (an operator image, an image processing target image, or the like). The scanner 17 is image reading means which includes a light source, an image sensor, and the like, and which optically reads an image that is displayed on a surface of a sheet-shaped document placed on the document glass. The scanner 17 supplies image data, which indicates the read image, to the CPU 11.

The printer 18 is image forming means in which, for example, a plurality of color toners are accumulated, and which forms a color image by transferring one or more types of toners to a medium, such as the paper, using an electrographic method. The printer 18 forms an image, which is indicated by the image data supplied from the CPU 11, on the medium. In a case where the CPU 11 controls the respective units included in the image processing device 10 by executing the program, functions which will be described later are realized.

Figure 2:
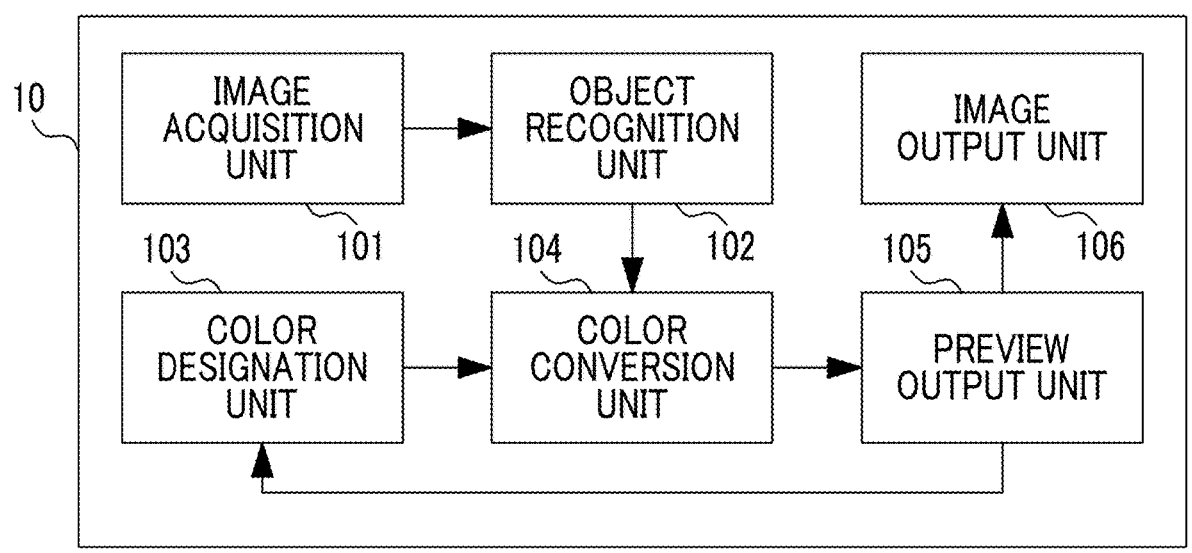
FIG. 2 is a diagram illustrating a functional configuration realized by the image processing device.

FIG. 2 illustrates a functional configuration realized by the image processing device 10. The image processing device includes an image acquisition unit 101, an object recognition unit 102, a color designation unit 103, a color conversion unit 104, a preview output unit 105, and an image output unit 106. The image acquisition unit 101 acquires an image (target image) which is a target of the above-described color conversion process. The image acquisition unit 101 acquires, for example, the image read by the scanner 17, the image formed on the medium by the printer 18, or the like as the target image (image which is a target of the color conversion process).

The image acquisition unit 101 supplies the acquired target image to the object recognition unit 102. The object recognition unit 102 recognizes an object which is included in the target image acquired by the image acquisition unit 101 and is expressed using a single color. The object recognition unit 102 is an example of a "recognition unit" according to the Example of the present invention. The object includes a text, a figure, a pattern, or the like which is included in the target image. In addition, a single color indicates literally one color. For example, even though the same color image is scanned, color irregularities are generated to some extent. However, such color irregularities are treated as the single color.

Each pixel, which expresses the image acquired by the image acquisition unit 101, is expressed by an RGB pixel value. The object recognition unit 102 calculates a hue value (in the Example, a value ranging from 0° to 360° in which 0° is set to a color of red, 120° is set to a color of green, and 240° is set to a color of blue), a saturation value (in the Example, a value ranging from 0% to 100%), and a lightness value (in the Example, a value ranging from 0% to 100%) in a Hue, Saturation, and Lightness (HSL) model for each pixel based on the pixel value.

A color of each pixel is expressed using the hue value, the saturation value, and the lightness value in a case where the hue exists, and is expressed using the saturation value and the lightness value (for example, a color of black in a case where the saturation value is smaller than 10 and the lightness value is lower than 10%, a color of white in a case where the saturation value is smaller than 10 and the lightness value is equal to or higher than 90%, and the like) in a case where the hue does not exist (the color of white, the color of black, a color of gray, or the like). Meanwhile, although the single color indicates, for example, a color in which the hue value, the saturation value, and the lightness value are the same, the color irregularities are permitted to some extent as described above, and thus the values may not completely coincide with each other. For example, even in a case of a few % of variation in the respective values, a variation to the extent of being approximately viewed as one color with human eyes is assumed as the single color.

In addition, the object recognition unit 102 performs an edge detection process using a well-known technology (for example, an edge detection method using a filter having a size corresponding to 5×5 pixels, or the like) with respect to the target image. The object recognition unit 102 recognizes an area, which is surrounded by the detected edge and includes pixels corresponding to the single color, as the object. The recognition of the object will be described with reference to FIG. 3 and FIGS. 4A to 4D.

Figure 3:
FIG. 3 is a diagram illustrating an example of an acquired image.

FIG. 3 illustrates an example of the acquired image. FIG. 3 illustrates a target image A1 which includes a background part B1, and a text background part B2 in which a text string B3 of "テスト画像 (test image in Japanese)" is expressed inside. All the background part B1, the text background part B2, and the text string B3 are expressed using single colors. Specifically, the background part B1 and the text string B3 are expressed using the color of white, and the text background part B2 is expressed using the color of blue.

Figure 4A:
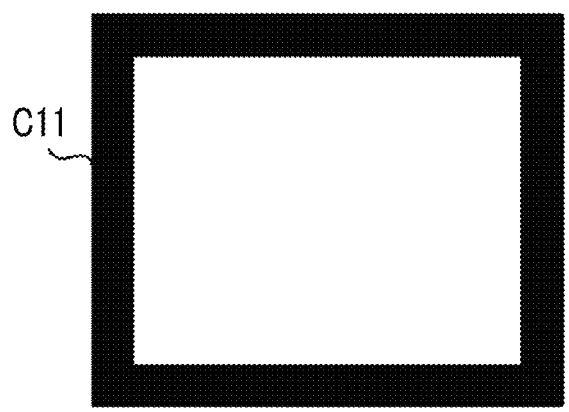
FIGS. 4A to 4D are diagrams illustrating examples of recognized objects.
Figure 4B:

FIGS. 4A to 4D illustrate examples of recognized objects. In FIGS. 4A to 4D, all the recognized objects are expressed by being painted in black. FIG. 4A illustrates an object C11 acquired by recognizing the background part B1. FIG. 4B illustrates an object C21, acquired by recognizing a set of pixels continuously connected to pixels which express an outer edge, in the text background part B2. The outer edge is an edge on an outer side, and has a rectangular shape in a case of the text background part B2.

Figure 4C:
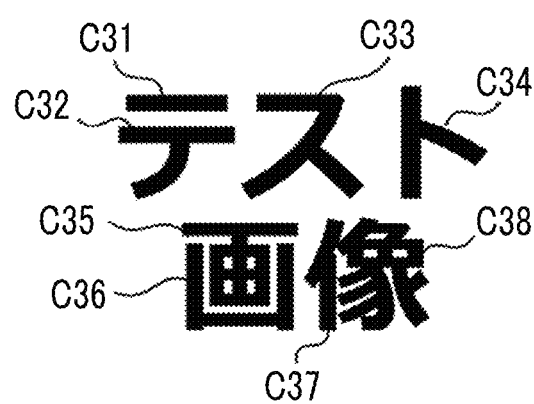
Figure 4D:
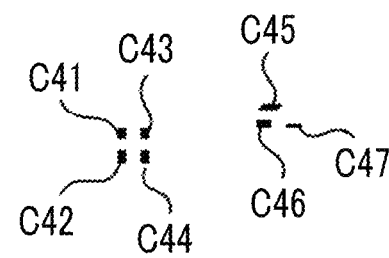

FIG. 4C illustrates eight objects C31 to C38 acquired by recognizing respective areas which respectively configure the text string B3 of "テスト画像 (test image)" and which are connected to each other. For example, in a text "テ (TE)", an upper horizontal line is recognized as the object C31, and a lower horizontal line and an oblique line are recognized as the object C32. FIG. 4D illustrates seven objects C41 to C47 acquired by recognizing areas surrounded by a part "画像 (image)" of the text string B3.

For example, in a case of a text "画", four objects C41 to C44, which are surrounded by a part "田", are recognized. The object recognition unit 102 generates object data by associating an object Identification (ID) used to identify the recognized object, a set of pixels expressed by each object, and a value which indicates a color of each object.

FIG. 5 illustrates an example of the object data. In the example of FIG. 5, an object ID "OB001" used to identify the object C11, a pixel group including "(x1, y1), (x2, y1), . . . ", a hue of "–", a lightness of "100" are associated (since the object C11 has a color of white, the lightness is 100% and the hue value does not exist). In addition, an object ID "OB002" used to identify the object C21, a pixel group including "(x30, y30), (x31, y30), . . . ", a hue of "240" which expresses the color of blue, and a lightness of "50" are associated with each other.

The pixel group is expressed using coordinates in a prescribed coordinate system (for example, a coordinate system in which an upper left corner is an original point, a horizontal direction is an x axis, and a vertical direction is an y axis) for the image. The object recognition unit 102 supplies the generated object data to the color conversion unit 104. The color designation unit 103 designates a color acquired through conversion in the above-described color conversion process (a process of converting an area of a designated color into the specific color). The color designation unit 103 displays, for example, an operation screen, which is used to designate a color to be converted, on the panel 16.

FIGS. 6A and 6B illustrate examples of the displayed operation screen. In the examples of FIGS. 6A and 6B, the color designation unit 103 displays a string "please designate a color to be converted" and a designated color input field D1 as the operation screen of the color conversion process. In addition, the color designation unit 103 displays a preview button E1. In a case where the user performs an operation of inputting a color into the input field D1 and pressing the preview button E1, the color designation unit 103 determines the color, which is input into the input field D1, as the designated color, and notifies the color conversion unit 104 of the designated color which is determined.

Meanwhile, the preview (which will be described with reference to drawings) is used to display a result (an image acquired after the color conversion process is performed) of the process before the image, on which the color conversion process is performed, is preserved. The color conversion unit 104 performs conversion on a pixel, which is included in the target image acquired by the image acquisition unit 101 and which has a color designated by the color designation unit 103, into the specific color (that is, performs the color conversion process). The color conversion unit 104 is an example of a "conversion unit" according to the Example of the present invention. It is demanded to perform the color conversion process in order to display the preview, and thus the color conversion unit 104 performs conversion into the specific color in a case where an operation of pressing the preview button E1 is performed.

Although the specific color may be any color, the color conversion unit 104 performs the color conversion process using the color of white as the specific color in the Example. The color conversion unit 104 performs conversion, which is different from a normal color conversion process, according to the color of the object recognized by the object recognition unit 102. In a case where it is assumed that conversion, which is performed to change an area corresponding to the designated color to the specific color, is first conversion, the color conversion unit 104 performs second conversion which is different from the first conversion.

Specifically, in a case where a color of an area, which is in contact with the outer edge of the recognized object, is designated and a difference (color difference) between the color of the object and the specific color is smaller than a first reference, the color conversion unit 104 performs an operation of performing conversion on pixels corresponding to the outer edge of the object into a color other than the specific color, as the second conversion. An object, a color of which is converted into the color other than the specific color through the second conversion, is an object which is in contact with an inside of the area corresponding to the designated color.

For example, it is assumed that the color of blue is designated as the designated color with respect to the target image A1 illustrated in FIG. 3. Here, conversion is performed on the object C21 illustrated in FIG. 4B and the objects C41 to C47 illustrated in FIG. 4D into the color of white, which is the specific color, as objects corresponding to the designated color. Here, the eight objects C31 to C38, which are surrounded by the object C21 and are illustrated in FIG. 4C, are objects which are in contact with the inside of the designated color area.

Figure 7A:
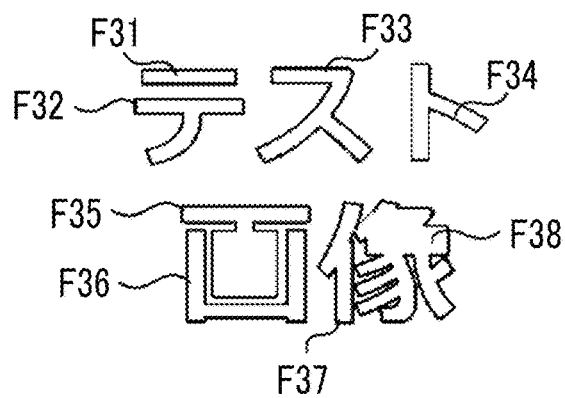
FIGS. 7A and 7B are diagrams illustrating examples of objects inside a designated color area.
Figure 7B:
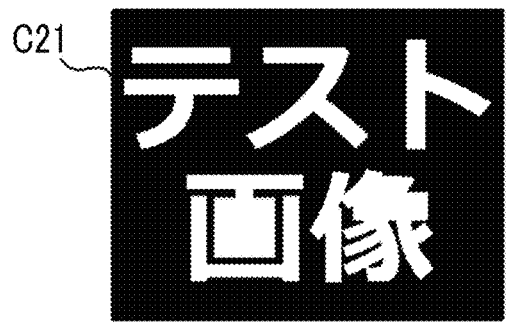

FIGS. 7A and 7B illustrate examples of the objects which are in contact with the inside of the designated color area. FIG. 7A illustrates outer edges F31 to F38 (in a case where the outer edges are not distinguished from each other, referred to as "outer edges F30") of the respective eight objects C31 to C38 which are in contact with the inside of the designated color area. All the outer edges F30 are in contact with the object C21 corresponding to the designated color (color of blue).

For example, in a case where a distance between two colors (a color of the object and the specific color) in an HSL color space is shorter than a threshold, the color conversion unit 104 determines that a difference between the two colors is smaller than the first reference. In the examples of FIGS. 7A and 7B, all the objects C31 to C38, which respectively have the outer edges F30, have the color of white. Therefore, the color conversion unit 104 determines that the difference between the colors of the objects and the specific color (the color of white in the Example) is smaller than the first reference.

In addition, for example, in a case of a color of pale gray which has a lightness value that exceeds 95%, it is determined that the difference from the specific color is smaller than the first reference. Meanwhile, a method of determining whether or not the color difference is smaller than the first reference is not limited thereto. For example, the color of each object and the designated color are specified using a name of the color, and it may be determined whether or not the color difference is smaller than the first reference (for example, a color difference between the color of yellow and the color of yellow green is smaller than the first reference, a color difference between the color of yellow and the color of green is equal to or larger than the first reference, or the like) based on a relationship between specified colors.

In the Example, the color conversion unit 104 performs conversion on pixels at a part other than the outer edge of the object which is in contact with the inside of the designated color area, into the color other than the specific color, and performs color conversion using a color (that is, the designated color) of the designated color area which is in contact with the outer edge as the color other than the specific color. In the examples of FIGS. 7A and 7B, the color conversion unit 104 performs conversion on the color (the color of blue) of the object C21 which is the designated color area that is in contact with the outer edges F30. In addition, the color conversion unit 104 performs conversion on all the eight objects C31 to C38 corresponding to the color of white into the color of blue.

Figure 8:
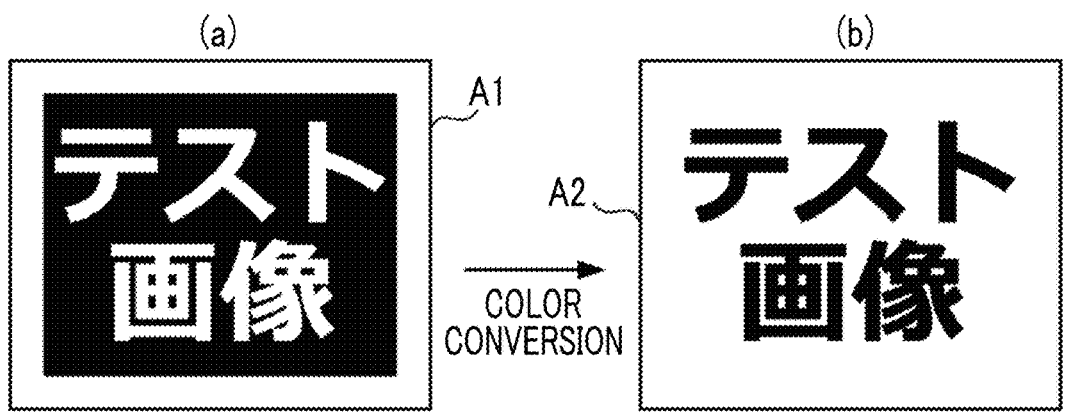
FIG. 8 is a diagram illustrating an example of a target image acquired before and after a color conversion process is performed.

FIG. 8 illustrates an example of the target image acquired before and after the color conversion process is performed. (a) of FIG. 8 illustrates the target image A1 acquired before the color conversion process is performed. (b) of FIG. 8 illustrates a target image A2 acquired after the color conversion process is performed. In the target image A2, conversion is performed on the object C21 corresponding to the designated color and the objects C41 to C47 into the color of white corresponding to the specific color. In addition, in (b) of FIG. 8, conversion is performed on the eight objects C31 to C38, which are objects that are in contact with the inside of the designated color area, into the color of blue (a part painted in black in (b) of FIG. 8).

The color conversion unit 104 supplies the image data, which indicates the target image acquired through the conversion, to the preview output unit 105. The preview output unit 105 outputs a preview image indicative of a preview of an image in which conversion is performed on a color by the color conversion unit 104. The preview output unit 105 outputs the preview image to, for example, the panel 16.

Figure 9:
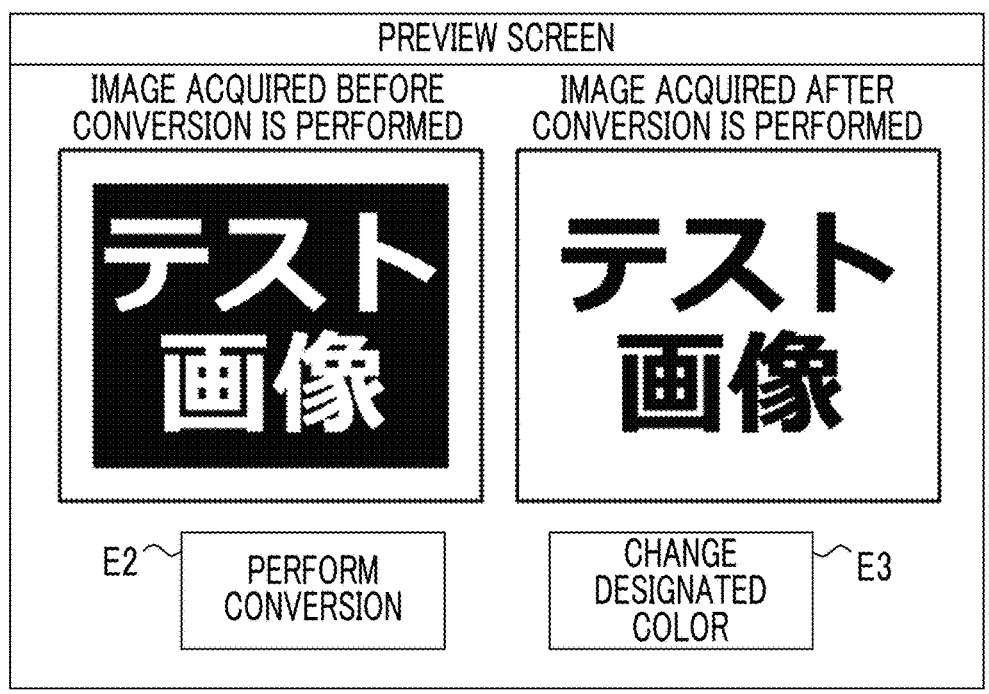
FIG. 9 is a diagram illustrating an example of a preview image.

FIG. 9 illustrates an example of the preview image. In the example of FIG. 9, the panel 16 displays the target image A1 as an image acquired before the conversion is performed and displays the target image A2 as an image acquired after the conversion is performed on the preview screen.

In addition, the panel 16 displays an operator E2 in which "perform conversion" is written and an operator E3 in which "change designated color" is written. In a case where the operator E3 is operated, the preview output unit 105 instructs the color designation unit 103 to display a color conversion process operation screen, as illustrated in FIGS. 6A and 6B. In a case where the operator E2 is operated, the preview output unit 105 supplies the image data, which is supplied from the color conversion unit 104, to the image output unit 106 without change.

The image output unit 106 outputs the target image, which is acquired after conversion is performed and is indicated by the supplied image data, that is, an image whose color is converted by the color conversion unit 104. An output destination of the image, which is acquired after conversion is performed, may be, for example, a registered user terminal or may be a medium on which an image is formed by the printer 18. The output destination may be predetermined or may be selected by the user after an operation of performing conversion is performed.

The image processing device 10 performs the color conversion process of performing conversion on a color in an image based on the above-described configuration.

Figure 10:
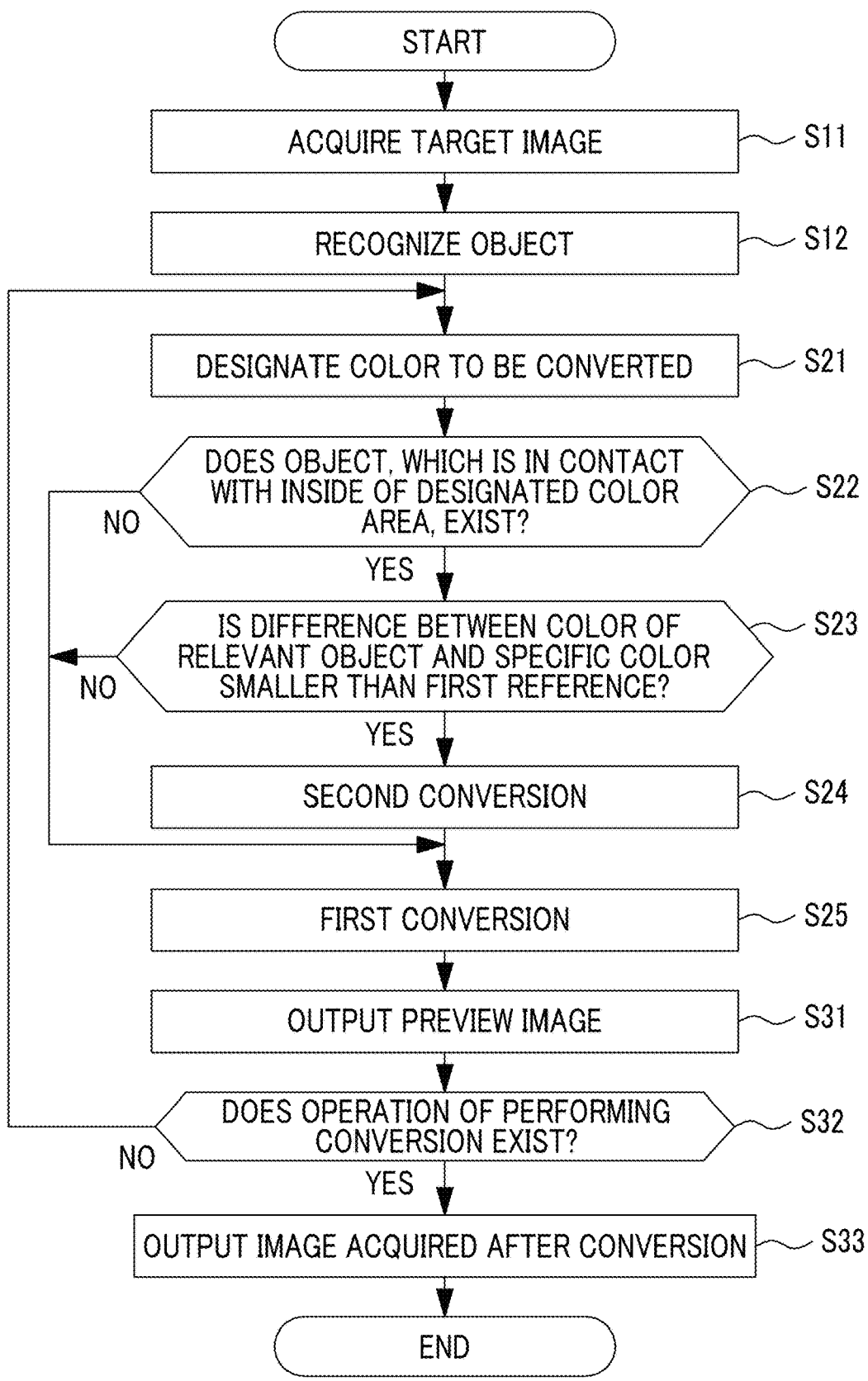
FIG. 10 is a flowchart illustrating an example of an operational sequence in the color conversion process.

FIG. 10 illustrates an example of an operational sequence in the color conversion process. The operational sequence starts in a case where the user performs an operation of designating the target image of the color conversion process. First, the image processing device 10 (image acquisition unit 101) acquires the target image which is the target of the color conversion process (step S11). Subsequently, the image processing device 10 (object recognition unit 102) recognizes an object, which is included in the acquired target image and is expressed using the single color (step S12).

Subsequently, the image processing device 10 (color designation unit 103) designates a color to be converted in the target image based on the user operation (step S21). Subsequently, the image processing device 10 (color conversion unit 104) determines whether or not the above-described object, which is in contact with the inside of the designated color area, exists in the recognized object (step S22). In a case where it is determined that a relevant object exists (YES), the image processing device 10 (color conversion unit 104) determines whether or not a difference between the color of the relevant object and the specific color is smaller than the first reference (step S23).

In a case where it is determined that the color difference is smaller than the first reference (YES), the image processing device 10 (color conversion unit 104) performs the above-described second conversion (convert the color of the object which is in contact with the inside of the designated color area into the color of the designated color area) (step S24). In a case where, after an operation in step S24 is performed, it is determined that the relevant object does not exist (NO) in step S22 or it is determined that the color difference is equal to or larger than the first reference (NO) in step S23, the image processing device 10 (color conversion unit 104) performs the above-described first conversion (converts the designated color of the target image into the specific color) (step S25).

Subsequently, the image processing device 10 (preview output unit 105) outputs the preview image which indicates the target image whose color is converted (step S31). Subsequently, the image processing device 10 determines whether or not the operation of performing color conversion exists (step S32). In a case where it is determined that the operation of performing conversion does not exist (NO), the image processing device 10 returns to step S21 (designate the color) and performs the operation. In a case where it is determined that the operation of performing conversion exists (YES), the image processing device 10 (image output unit 106) outputs an image in which conversion is performed on the color (step S33), and ends the operational sequence.

In a case where the object which is in contact with the inside of the designated color area exists in the target image, that is, the difference between the color of the object and the specific color is smaller than the first reference, and the normal color conversion process of performing conversion on the area corresponding to the designated color into the specific color is simply performed, the following result is acquired.

Figure 11:
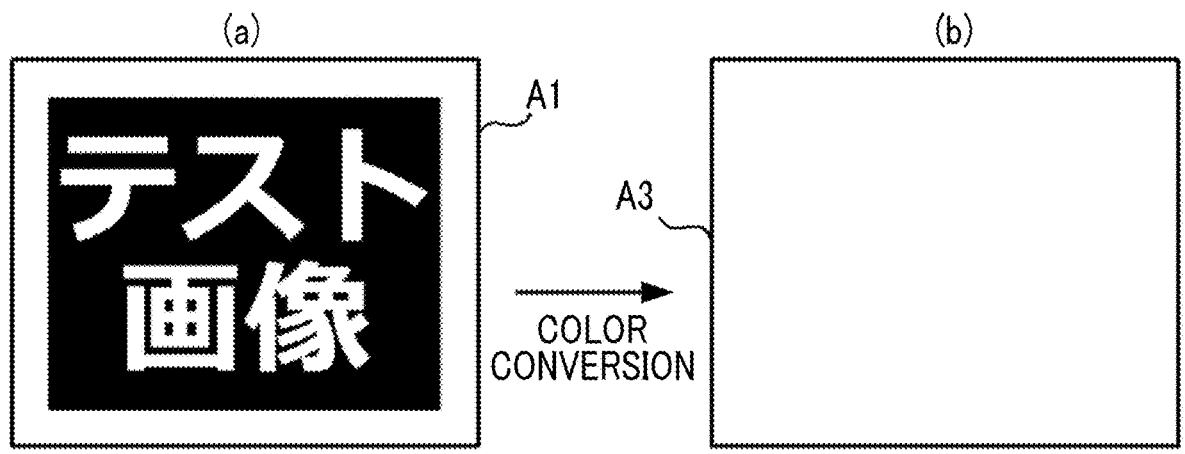
FIG. 11 is a diagram illustrating an example of an image acquired through conversion performed using a normal color conversion process.

FIG. 11 illustrates an example of images on which conversion is performed using the normal color conversion process. (a) of FIG. 11 illustrates the target image A1.

In a case where, in the target image A1, conversion is performed on the object C21 corresponding to the designated color and the objects C41 to C47 into the color of white corresponding to the specific color, a target image A3, which is entirely white, is acquired as illustrated in (b) of FIG. 11. As above, the object, which is in contact with the inside of the designated color area, has the same color as the specific color, it is not possible to understand boundaries of the area where color conversion is performed, and thus an event, in which information (information of text "テスト画像 (test image)") expressed by the object is lost, is generated.

In the Example, the color of the object which is in contact with the inside of the designated color area is also converted into the color other than the specific color, as expressed in the target image A2, which is acquired after the conversion is performed, as illustrated in (b) of FIG. 8. Therefore, the loss of the information, which occurs in a case where conversion is performed on the pixels corresponding to the designated color into the specific color, is prevented.

2. MODIFICATION EXAMPLE

The above-described Example is only an example according to the Example of the present invention, and modifications are possible as below. In addition, the Example and each modification example may be implemented by being combined as needed. Here, each modification example may be implemented by giving a priority (by ranking to determine precedence in a case where events, which compete for implementation of each modification example, are generated). In addition, a common value or the like may be acquired by, for example, combining the modification examples, which use different parameters to acquire the common value or the like, and using the parameters together. Further, a single value may be acquired by adding individually acquired values or the like according to some rules. In addition, here, different weights may be given to the respective parameters to be used.

2-1. Color (1) Acquired After Conversion Is Performed

In the Example, the color conversion unit 104 performs the first conversion of converting the designated color into the specific color, together with the second conversion of converting the color of the object which is in contact with the inside of the designated color area. In the Example, the color, which is acquired after the second conversion is performed, is the color of the designated color area (that is, the designated color). Here, as the color of the designated color area is a color which is closer to the specific color, information (such as information "テスト画像 (test image)" illustrated in (b) of FIG. 8) expressed by the image, which is acquired after the conversion is performed, becomes difficult to be viewed.

Here, in such a case, the color conversion unit 104 may change the color acquired after conversion is performed (the color other than the specific color). In the modification example, in a case where the difference between the specific color and the color of the designated area is smaller than the second reference, the color conversion unit 104 performs conversion using a color, which has a larger difference from the specific color than the color of the designated color area, as the color other than the specific color. Similarly to the first reference according to the Example, the color conversion unit 104 uses the prescribed second reference.

The second reference may be the same as the first reference or may be larger or smaller than the first reference. It is desired to use, as the second reference, a distance in the HSL color space in a case where, for example, it is difficult to distinguish the difference between the colors. Here, for example, in a case where a color having a lightness of 90% is designated, the color conversion unit 104 determines that the difference between the specific color and the color of the designated area (that is, the designated color) is smaller than the second reference.

As a color whose difference from the specific color (color of white) is larger than the designated color (the color having a lightness of 90%), the color conversion unit 104 selects, for example, a color having a lightness of 70% as the color other than the specific color and performs conversion. Meanwhile, here, needless to say, the color conversion unit 104 selects a color, which has a color difference from the specific color that is equal to or larger than the second reference, as the color other than the specific color.

Figure 12:
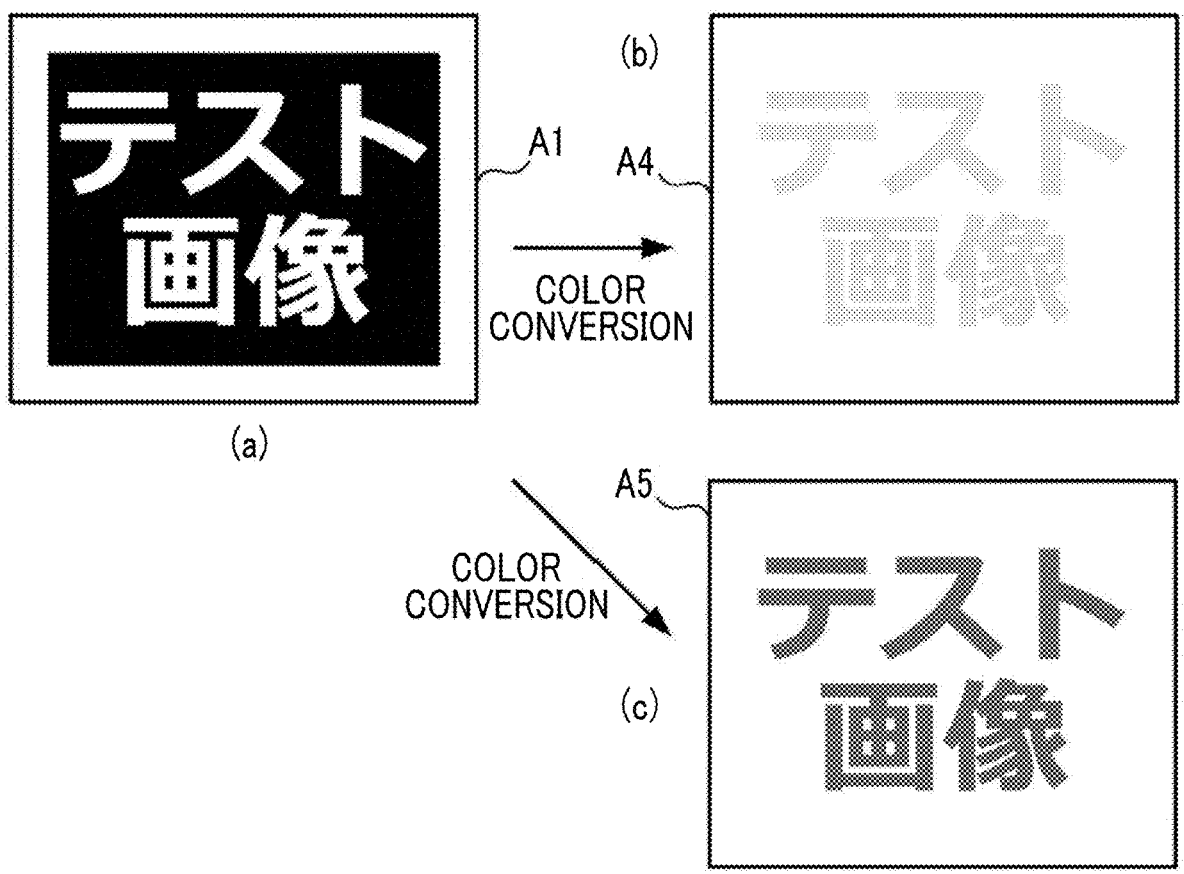
FIG. 12 is a diagram illustrating an example of a color conversion process according to a modification example.

FIG. 12 illustrates an example of the color conversion process according to the modification example. (a) of FIG. 12 illustrates the target image A1 as the image acquired before the color conversion process is performed. (b) of FIG. 12 illustrates a target image A4, which is acquired after the conversion is performed, in a case where the difference between the specific color and the color of the designated area is smaller than the second reference. In the target image A4, the designated color is the color of pale gray, and thus the text "テスト画像 (test image)" is difficult to be viewed. (c) of FIG. 12 illustrates the target image A4, which is acquired after the conversion is performed, in a case where the difference between the specific color and the color of the designated area is smaller than the second reference.

The "テスト画像 (test image)" is illustrated using the color of gray, which is darker than the color of (b) of FIG. 12 such that the difference from the specific color is larger than the difference from the designated color.

2-2. Color (2) Acquired After Conversion is Performed

A method for determining a color, acquired after conversion is performed, in the second conversion is not limited thereto. For example, the image output unit 106 outputs the image, acquired after the color conversion is performed, to a medium using a plurality of toners respectively having different colors. Here, the color conversion unit 104 may perform conversion using a color of one type of toner as the color other than the specific color among the plurality of toners.

The plurality of toners are, for example, Yellow, Magenta, Cyan, blacK (YMCK) toners. The color conversion unit 104 performs conversion using a color of a toner (for example, a toner having a color of black), which is predetermined in toners, as the color other than the specific color. In a case where a color using the plurality of toners is set to the color acquired after conversion is performed, the toners are consumed each time, that is, every time in which the conversion is performed due to the image which is acquired after the conversion is performed.

Meanwhile, in the modification example, the color of the toner used for the second conversion may be dynamically changed. For example, the color conversion unit 104 may perform conversion using a color of a toner, which has the largest residual quantity among the plurality of toners, as the color other than the specific color. In this case, the printer 18 illustrated in FIG. 1 includes a sensor which detects the residual quantity of each color toner, and supplies a measurement value of the sensor to the color conversion unit 104. The color conversion unit 104 specifies a toner, in which the measurement value indicative of the largest residual quantity of the toner is measured, and performs conversion using the color of the specified toner as the color other than the specific color.

2-3. Designated Color Area Contact Method [0063]

In the Example, the whole outer edge of the object, which is in contact with the inside of the designated color area, is in contact with the designated color area. In other words, although the outer edge of the object which becomes the second conversion target is in contact with an area having the single color, there is a case where the object is in contact with two or more areas which have different colors.

Figure 13:
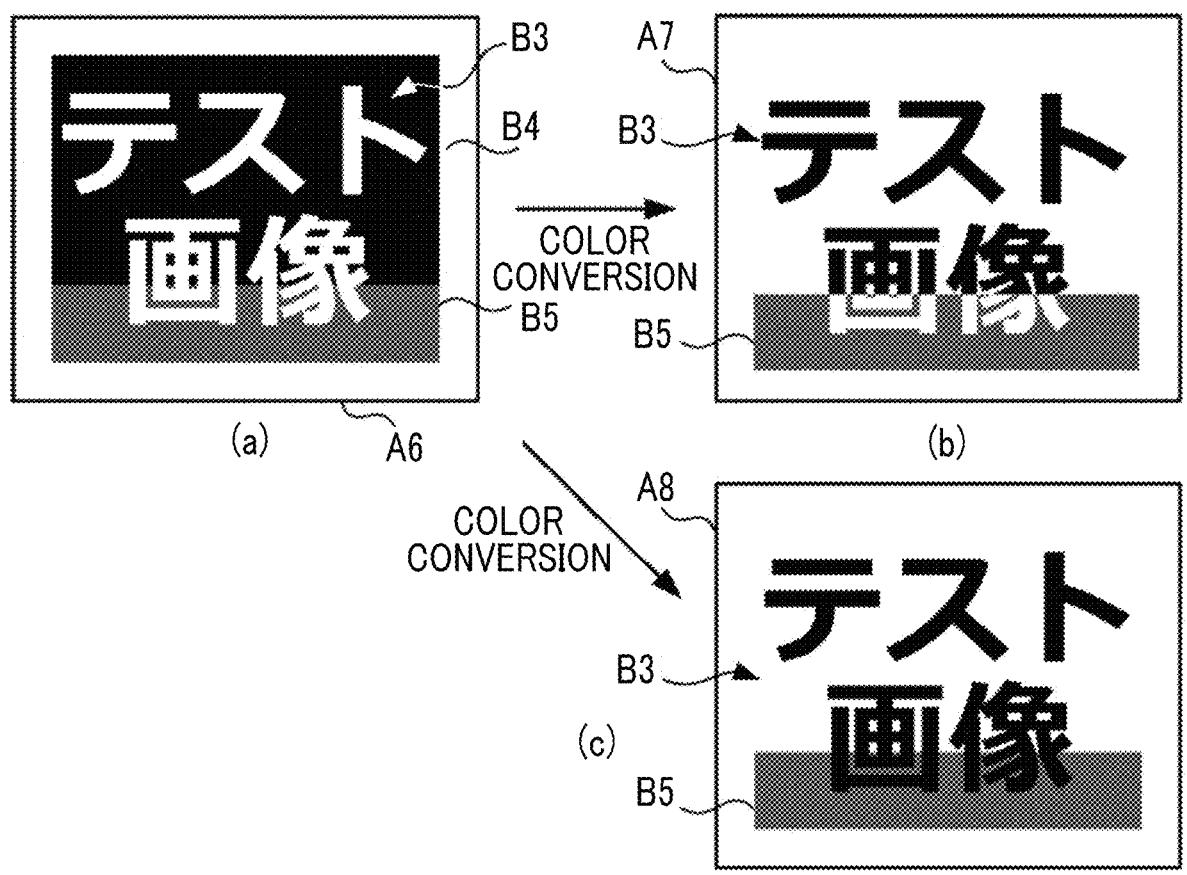
FIG. 13 is a diagram illustrating an example of a target image according to the modification example.

FIG. 13 illustrates an example of the target image according to the modification example. (a) of FIG. 13 illustrates a target image A6 in which a white outlined text string B3 is expressed inside the text background parts B4 and B5. It is assumed that the text background part B4 is the color of blue (a hue of 240°) and the text background part B5 is a color of pale blue (a hue of 210°). Here, the objects C35 to C38, which are illustrated in FIG. 4C and configure the text "画像 (image)" corresponding to a foreground (image which is viewed in front of the background) with respect to the backgrounds, are in contact with two or more areas (text background parts B4 and B5) which have different colors.

In a case where the two or more areas, which have different colors, are in contact with the outer edge of the object and the color of any of the areas is designated, the color conversion unit 104 performs conversion (performs the second conversion) on pixels in locations, which are in contact with a color designation area in the outer edge, into the color other than the specific color, and does not perform conversion (does not perform the second conversion) on pixels on the other locations into the color other than the specific color.

The color conversion unit 104 performs the second conversion on the pixels at a part (a part which becomes the foreground of the color designation area) interposed in the outer edge on which the second conversion is performed, similarly to the pixels of the outer edge. In addition, the color conversion unit 104 does not perform the second conversion on the pixels at a part (a part which becomes the foreground of an area which is not the color designation area), which is interposed in the outer edge on which the second conversion is not performed, similarly to the pixels in the outer edge. For example, in a case where the color of blue is designated for the target image A6, the color conversion unit 104 performs the second conversion on a location (a foreground part of the text background part B4) which is in contact with the text background part B4 corresponding to the color designation area of the color of blue, as illustrated in (b) of FIG. 13, thereby performing conversion into the color of blue.

In contrast, the color conversion unit 104 causes an original color (color of white) to remain without performing the second conversion on a location (a foreground part of the text background part B5) which is not in contact with the text background part B4 and is in contact with the text background part B5. (b) of FIG. 13 illustrates a target image A7 in which conversion is performed on the text background part B4 corresponding to the designated color area into the color of white, the text background part B5 remains without change while conversion is not performed thereon, and the text string B3, which acquired through conversion performed on the foreground part of the text background part B4 into the color of blue as described above and conversion is not performed on the foreground part of the text background part B5, is expressed.

In a case where the second conversion is performed on the target image A6, similarly to the Example, the first conversion (conversion into the specific color) is not performed on the text background part B5, and thus conversion is performed into a target image A8, in which the text string B3 acquired through conversion performed on the foreground part of the text background part B5 into the color of blue is expressed, as illustrated in (c) of FIG. 13. Here, since the text background part B5 (a hue of 210°) is close to a color of the designated color (hue of 240°), a lower half part of the " 画像 (image)" is hardly viewed.

In contrast, in the target image A7 on which the color conversion according to the modification example is performed, original white outlined text remains at a part of the text background part B5. In many cases, a foreground image, such as the text string B3, is expressed using a conspicuous color with respect to a color of the background so as to be easily viewed. In the modification example, the second conversion is not performed on the foreground of a part, such as the text background part B5, where the background remains while the color conversion is not performed.

2-4. Conversion Performed on Only Outer Edge

In the Example, the color conversion unit 104 performs conversion (second conversion) not only on the pixels of the outer edge of the object but also pixels at the part other than the outer edge into the color other than the specific color. The present invention is not limited thereto, and the second conversion may be performed on only the pixels of the outer edge.

Figure 14A:
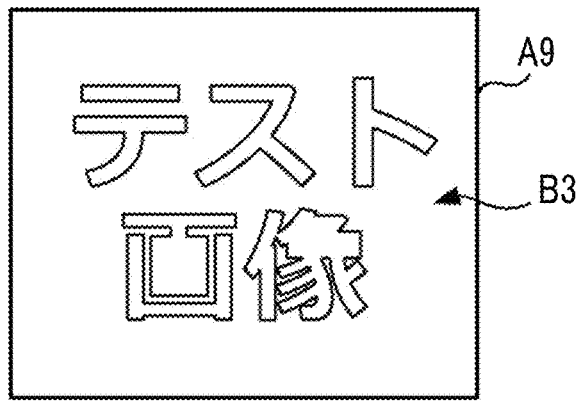
FIGS. 14A to 14D are diagrams illustrating examples of the target image, which is acquired after the conversion is performed, according to the modification example.

FIGS. 14A to 14D illustrate examples of the target image, which is acquired after the conversion is performed, according to the modification example. In the example of FIG. 14A, the target image A9, in which only the outer edge of the text string B3 of "テスト画像 (test image)" is expressed.

The pixels at the part other than the outer edge of the text string B3 are expressed using the color of white which is the original color. Here, in a case of a text which does not have a surrounded inner part, such as "テスト (test)", the text is expressed with only the outer edge, and thus the loss of the information is prevented.

In contrast, in a case of text which has a part surrounded by an object that expresses text as in the " 画像 (image)", a part of information is lost because the shape of the part is not known. Here, the second conversion may be performed as below. In the examples of FIGS. 14A to 14D, the object recognition unit 102 recognizes the object C21 (referred to as a "first object" in FIG. 14B), and objects C35 and C38 (referred to as a "second object" in FIG. 4C) which are in contact with an inside of the object C21.

Figure 14B:
Figure 14C:
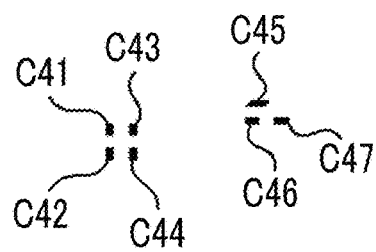

In addition, the object recognition unit 102 recognizes the objects C41 to C47 which are in contact with the insides of the objects C35 and C38 (referred to as a "third object" in FIG. 14C). In a case where a color of the first object and a color of the third object, which are recognized by the object recognition unit 102, are common to each other and the color of the first object is designated as a color of an area (a color of an area which is in contact with the outer edge of the second object in the modification example) which is in contact with the outer edge of the object described in the Example, the color conversion unit 104 performs conversion on pixels of the inner edges in addition to the outer edge of the second object into the color other than the specific color.

Figure 14D:
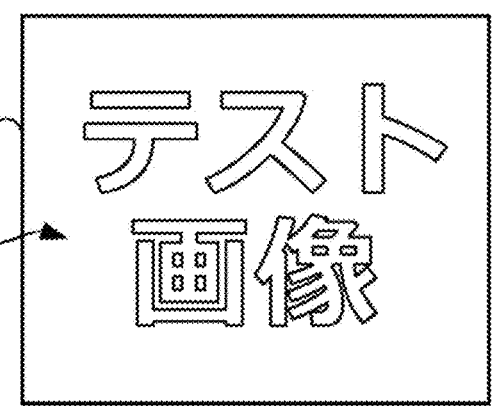

The objects illustrated in FIGS. 14B and 14C are the backgrounds of the white outlined text, and thus the colors thereof are common. Therefore, the color conversion unit 104 performs conversion on the pixels of the inner edge in addition to the outer edges of the objects C35 and C38 into the color other than the specific color. FIG. 14D illustrates a target image A10 acquired through the above-described conversion. The target image A10 illustrates the text " 画像 (image)", in which a shape of the part surrounded by the object becomes clear due to the pixels of the inner edge.

As described above, in the modification example, the objects are expressed using not only the pixels of the outer edge but also pixels of the inner edge, thereby preventing the loss of the information expressed by a shape of the part surrounded by the object. Meanwhile, there is a case where the above-described first to third objects are recognized in plural.

Figure 15:
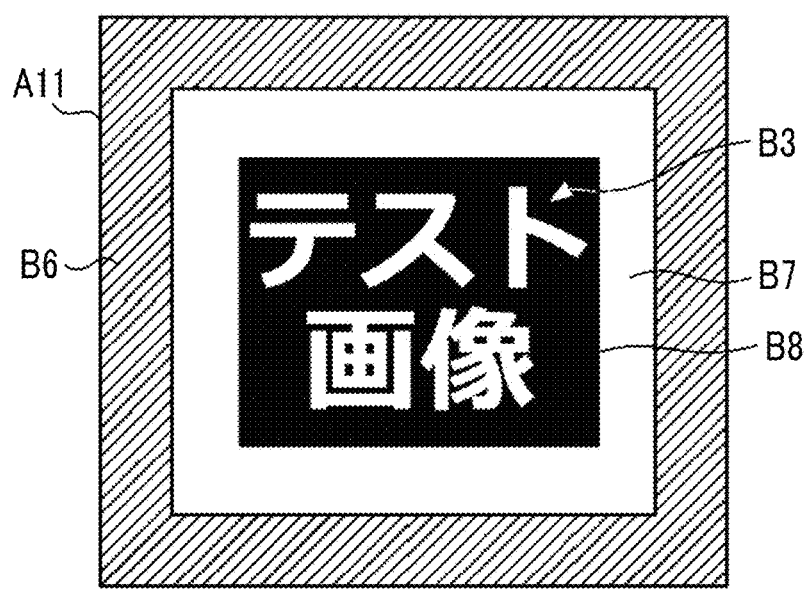
FIG. 15 is a diagram illustrating another example of the target image, which is acquired after the conversion is performed, according to the modification example.

FIG. 15 illustrates another example of the target image, which is acquired after the conversion is performed, according to the modification example. FIG. 15 illustrates a target image A11 which expresses a first background part B6 having a color of green, a second background part B7 having the color of white inside the first background part B6, and a third background part B8 having the color of blue inside the second background part B7.

In the third background part B8, the white outlined text string B3 is expressed. Here, the first background part B6, the second background part B7, and the third background part B8 are recognized as first, second, and third objects, respectively. Here, the color of the first object is different from the color of the third object. In addition, the second background part B7, the third background part B8, and the text string B3 are recognized as first, second, third objects, respectively. Here, all the colors of the first and third objects are common to the color of white (first case).

In addition, the third background part B8, the text string B3, and a part surrounded by the text string B3 are respectively recognized as the first, second, and third objects. Here, both the colors of the first and third objects are the color of blue that is the common (second case). In both the first and second cases, the color conversion unit 104 performs conversion on the pixels of the inner edge into the color other than the specific color in a case where, for example, a size ratio of the first object to the second object is smaller than the threshold, and does not perform conversion on the pixels of the inner edge into the color other than the specific color in a case where the size ratio is equal to or higher than the threshold. Here, the size is, for example, a size of an area surrounded by the outer edge of the object.

That is, even in a case where another object is expressed inside, the size is calculated using only the outer edge, thereby being not affected by the object. For example, in the first case, a size ratio of the third background part B8, which is the second object, to the second background part B7, which is the first object, is acquired. It is assumed that both the background parts have a square shape and a length of one side of the second background part B7 is 1.5 times larger than the third background part B8. Here, in a case where it is assumed that the size of the third background part B8 is 1, the size of the second background part B7 is 1.5×1.5=2.25, and thus the size ratio is 1×2.25=approximately 0.44.

In contrast, in the second case, a size ratio of the text string B3, which is the second object, to the third background part B8, which is the first object, is acquired. The text string B3 is text and is a set of thin lines, and thus it is assumed that the text string B3 is, for example, approximately 10% of the size of the third background part B8 which is the square. Here, the color conversion unit 104 uses, for example, a value of around 0.2 as the threshold. Therefore, in the first case, the size ratio is equal to or higher than the threshold, and thus the second conversion is not performed on the third background part B8 which is the second object. In the second case, the size ratio is equal to or higher than the threshold, and thus the second conversion is performed on the text string B3 which is the second object.

In a case where the size ratio of the second object with respect to the first object is lower than the threshold, there is a high probability that the second object is expressed based on the thin lines and dots and used to express the text, the code, the symbol, or the like, compared to a case where the size ratio is equal to or higher than the threshold. Therefore, in a case where a boundary of a part surrounded by the second object is lost, information expressed by the text, the code, the symbol, or the like is lost. In the modification example, conversion is performed similarly on the pixels of the inner edge and the pixels of the outer edge for the second object, in which there is a high probability of expressing the text, the code, the symbol, or the like.

In addition, in a case where the size ratio is equal to or higher than the threshold, there is a low probability that the second object expresses the text, the code, the symbol, or the like, compared to the case where the size ratio is lower than the threshold. Therefore, even in a case where a boundary of the third object surrounded by the second object is not viewed, there is a low probability that the information is lost. In a case where there is no reason of the loss of the information, such as the text, there is a high probability of the color conversion intended by the user in a case where the boundary of the third object is not viewed. Therefore, the size ratio is taken into consideration.

2-5. Method for Recognizing Object

The object recognition unit 102 may recognize an object using a different method from the Example. The object recognition unit 102 may recognize a text object using, for example, a text recognition technology such as an Optical Character Recognition (OCR).

In addition, in a case where information, which is capable of specifying the pixels of the object, is included in meta information included in the image data, the object recognition unit 102 may recognize the object using the meta information. In addition, the object recognition unit 102 may recognize an area, in which identical colored pixels are consecutively connected, as an object. In brief, any method may be used in a case where an area of the single color is recognized as the object.

2-6. Method for Realizing Each Function

In each of the functions illustrated in FIG. 2 or the like, two or more functions may be integrated, and one function may be divided into two or more function. In addition, an operation which is performed by a certain function may be performed by another function. In addition, each of the functions is not limited to be realized by only the image processing device, and may be realized by two or more devices (that is, a system) which include the image processing device. In brief, in a case where a function, which is equivalent to each of the functions illustrated in FIG. 2, is realized in the whole device or system, any method of realizing the function may be used.

2-7. Category of Invention

The present invention is applied to the image processing device 10, which includes the image reading means and the image forming means, in the Example. However, the present invention is not limited thereto. For example, the present invention may be applied to an information processing apparatus, such as a personal computer, a smart phone, or a tablet terminal, which does not include both the image reading means and the image forming means. Here, the color conversion target image may be acquired from the external device or may be generated in the information processing apparatus.

In addition, the present invention is understood as an information processing method used to realize a process performed by each information processing apparatus, and is understood as a program causing a computer, which controls each device, to perform a function. The program may be provided in a form of a recording medium, such as an optical disk, which stores the program, or may be provided in a form which is downloaded to a computer through a communication line, such as the Internet, and makes available by installing the program.

The foregoing description of the examples of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
recognize an object which is included in an image and is expressed using a single color;
perform conversion on a pixel, which is included in the image and corresponds to a designated color, into a specific color, and,
in a case where a color of an area, which is in contact with an outer edge of the recognized object, is designated and a difference between the color of the recognized object and the specific color is smaller than a first reference, perform conversion on a pixel of the outer edge of the recognized object into a color other than the specific color, wherein the color other than the specific color is the color of the area, and in a case where the difference between the specific color and the color of the area is smaller than a second reference, perform conversion using a color, which has a larger difference from the specific color than from the color of the area, as the color other than the specific color.

2. The information processing apparatus according to claim 1, wherein the processor performs conversion on a pixel at a part other than the outer edge of the recognized object which is in contact with an inside of the area into the color other than the specific color.

3. The information processing apparatus according to claim 2, wherein the image, on which the conversion is performed, is output to a medium using a plurality of toners which have respectively different colors, and wherein the processor performs conversion using a color of one type of toner as the color other than the specific color.

4. The information processing apparatus according to claim 3, wherein the processor performs conversion using a color of a toner, which has a largest residual quantity, of the plurality of toners as the color other than the specific color.

5. The information processing apparatus according to claim 2, wherein, in a case where two or more areas, which have different colors, are in contact with the outer edge of the recognized object and a color of any of the areas is designated, the processor performs conversion on only a pixel in a location, which is in contact with the area, of the outer edge of the recognized object into the color other than the specific color.

6. The information processing apparatus according to claim 1, wherein the image, on which the conversion is performed, is output to a medium using a plurality of toners which have respectively different colors, and wherein the processor performs conversion using a color of one type of toner as the color other than the specific color.

7. The information processing apparatus according to claim 6, wherein the processor performs conversion using a color of a toner, which has a largest residual quantity, of the plurality of toners as the color other than the specific color.

8. The information processing apparatus according to claim 6, wherein, in a case where two or more areas, which have different colors, are in contact with the outer edge of the recognized object and a color of any of the areas is designated, the processor performs conversion on only a pixel in a location, which is in contact with the area, of the outer edge of the recognized object into the color other than the specific color.

9. The information processing apparatus according to claim 1, wherein, in a case where two of more areas, which have different colors, are in contact with the outer edge of the recognized object and a color of any of the areas is designated, the processor performs conversion on only a pixel in a location, which is in contact with the area, of the outer edge of the recognized object into the color other than the specific color.

10. The information processing apparatus according to claim 1, wherein, in a case where the processor recognizes a first object, a second object which is in contact with an inside of the first object, and a third object which is in contact with an inside of the second object, a color of the first object and a color of the third object are common, and the color of the first object is designated as a color of an area which is in contact with the outer edge of the recognized object, the processor performs conversion on pixels of an inner edge in addition to an outer edge of the second object into the color other than the specific color.

11. The information processing apparatus according to claim 10, wherein the processor does not perform conversion on the pixels of the inner edge into the color other than the specific color in a case where a size ratio of the second object to the first object is equal to or higher than a threshold.

12. A non-transitory computer readable medium storing a program causing a computer to:

recognize an object which is included in an image and is expressed using a single color; and perform conversion on a pixel, which is included in the image and corresponds to a designated color, into a specific color, and, in a case where a color of an area, which is in contact with an outer edge of the recognized object, is designated and a difference between the color of the recognized object and the specific color is smaller than a first reference, perform conversion on a pixel of the outer edge of the recognized object into a color other than the specific color, wherein the color other than the specific color is the color of the area, and in a case where the difference between the specific color and the color of the area is smaller than a second reference, perform conversion using a color, which has a larger difference from the specific color than from the color of the area, as the color other than the specific color.

* * * * *